Oct. 28, 1969    J. W. DOOLEY    3,474,660

THERMAL CONDUCTIVITY DETECTOR

Filed Feb. 17, 1966

INVENTOR.
JOHN W. DOOLEY
BY
Charles A. Weigel, Jr.

United States Patent Office 3,474,660
Patented Oct. 28, 1969

3,474,660
THERMAL CONDUCTIVITY DETECTOR
John W. Dooley, Chadds Ford, Pa., assignor to Hewlett-Packard Company, a corporation of California
Filed Feb. 17, 1966, Ser. No. 528,254
Int. Cl. G01n 31/00
U.S. Cl. 73—27                          6 Claims

ABSTRACT OF THE DISCLOSURE

A thermal conductivity cell is constructed to have a cylindrical detector cavity with an axially disposed detecting element and a gas inlet and outlet. The gas inlet is oriented such that the gas flows in a spiral manner through the detector cavity, thereby reducing turbulence about the axially disposed detecting element.

---

This invention relates to an improved thermal conductivity cell and, more particularly, to a device for measuring changes in the thermal conductivity of gases which device has an improved response characteristic.

A common method employed to determine the concentration of the various components eluting, for example, from a gas chromatograph, is to pass the gas stream containing the components through a measuring cell which contains an electrically energized, current carrying temperature sensitive transducer element. The transducer is coupled to a suitable measuring device, usually a bridge type circuit, which relates the electrical behavior of the transducer to the concentration of the component within the cell.

Typical detecting elements which may be satisfactorily employed in a measuring cell for this purpose are thermistors, thermal conductivity filaments and catalytic combustion filaments. All of these elements are electrically resistive in nature and the value of electrical resistance which they exhibit is dependent upon the temperature of the environment in which they are located.

When used to continuously monitor the output of an analytical instrument such as a gas chromatograph, the carrier gas and any eluted separated sample components from the gas chromatograph are passed through the measuring cell, at a rate of flow which is suitable to the particular gas mixture under analysis and providing a suitable energizing current in the transducer. The carrier gas, which is flowing through the cell, passes over and around the electrically energized detecting element and continuously removes the heat generated by the electric current. Due to the thermal conductivity of the carrier gas and its rate of flow the detecting element achieves a definite temperature and a definite temperature gradient is established between the detecting element and the measuring cell wall. Under these circumstances the transducer assumes a particular value of electrical resistance within its linear or unsaturated range of operation.

As the components of a sample of the fluid stream under analysis are separated and passed through the measuring cell, admixed with carrier gas, the temperature of the detecting element changes. The temperature of the detecting element at a given time, is dependent on the thermal conductivity of the fluid therein, which, in turn, is a function of the concentration of the sample component passing through the cell at any given time.

Although many suitable thermal conductivity cells for this purpose are in use today they suffer from many common disadvantages. Among these disadvantages are those of slow response due to dead spaces within the cell itself and due to a lack of a positive flow system. Many known cells use two cavities, each having a detecting element, connected in series with the gas flow. Cells of this type, although having a greater sensitivity, cause excessive "tailing" due to the time delay between the first cell and the second cell receiving or observing the same sample component.

Much work has been done to decrease turbulence present in many thermal conductivity cells and to obtain relatively smooth laminar flow adjacent the detecting element itself. These efforts have not been entirely successful and result in cells having higher noise levels than is generally desired.

It is, therefore, an object of this invention to obviate many of the disadvantages of the prior art thermal conductivtiy cells.

Another object of this invention is to provide an improved thermal conductivity cell that provides a relatively sensitive response to changes in gas constituency and yet is relatively free of electrical noise.

In accordance with a preferred embodiment of this invention a thermal conductivity cell is constructed to have a heat absorbing body enclosing a cylindrical chamber. The chamber itself is provided with a gas inlet conduit which discharges the gas into one end of the cylindrical chamber tangentially of the chamber wall so as to create a spiral or vortex type gas flow from one end of the chamber to the other. An outlet conduit at the other end of the chamber permits the gas to be withdrawn therefrom. The detecting element itself is positioned axially at the very center of the chamber such that it "sees" gas of essentially zero velocity which is relatively free of the deleterious effects of turbulence which produce electrical noise.

In a preferred embodiment of the invention two such cells are employed in parallel and the gas flow is supplied equally and directed simultaneously to each of the cells and then recombined. In this instance the detecting elements may be connected in opposite arms of a bridge or other suitable electrical network of known type.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

Figure 1:
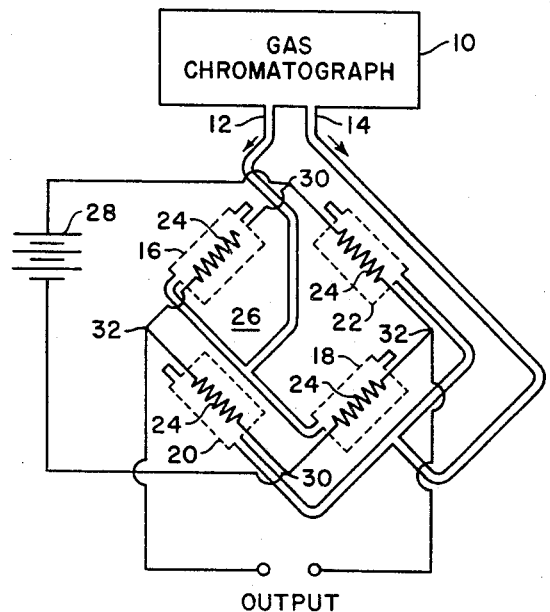
FIGURE 1 is a schematic diagram of a thermal conductivity detection system constructed in accordance with a preferred embodiment of this invention.

With reference first to FIG. 1 there is illustrated a typical gas chromatograph denoted by the reference numeral 10 from which carrier gas and the separated sample components may be conducted via conduits 12 and 14 to a first pair of measuring cells 16, 18 and a second pair of measuring cells 20, 22, respectively. Either of the first or second pairs of measuring cells 16, 18, 20, 22 may be used for measuring or reference purposes in a known manner. The measuring and reference cells contain electrically energized, current-carrying temperature sensitive transducers 24, hereinafter referred to as a detecting element, which form part of a conventional bridge detecting circuit denoted generally by the reference numeral 26.

The bridge circuit 26 may be energized by a suitable source of electrical energy illustrated as a battery 28 applied across a pair of bridge input terminals 30. One of each of the pairs of detecting elements 24 are connected in series and each of the series combinations connected across the bridge input terminals 30. The junctions between the respective pairs of serially connected detecting elements 24 form the output terminals 32 of the bridge. The detecting elements 24 are selected to have substantially identical electrical characteristics and may be any of the well known resistive type elements whose resistance varies as a function of temperature. Such elements may include thermistors, catalytic combustion filaments, or thermal conductivity filaments of known type. Additionally, the bridge 26 may be provided with suitable span resistors and balancing potentiometers (not shown) as may be necessary.

Figure 2:
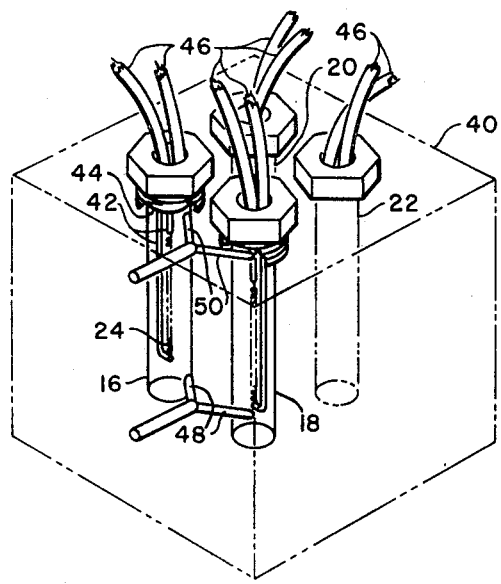
FIGURE 2 is a perspective phantom view of a thermal conductivity block used in the system of FIG. 1.
Figure 3:
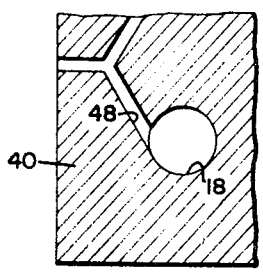
FIGURE 3 is a section view of the entry to the cell 18 of FIG. 1.

The measuring cells 16, 18, 20, 22 are constructed in accordance with this invention in the manner illustrated in FIG. 2. Each of these cells are formed as by drilling in a suitable block or housing 40 which may be cast of a suitable heat conductive material such as brass or aluminum. Each of the cells 16, 18, 20, 22 are cylindrical in shape and have their detecting element 24 axially positioned therein. The element 24 is illustrated only with respect to cells 16 and 18 for simplicity of drawing but the remaining cells are similarly constructed. The detecting element 24 is supported by wires 42 which are mounted in an insulating gland 44. Suitable electrical connections as by wires 46 may be made through the gland 44 to the wires 42.

In accordance with this invention an inlet conduit 48 to the cell 16 is formed in the block 40 as by drilling such that its discharge orifice intercepts the lower end of the cell 16 (in the drawing) tangentially to the wall of the cylindrical chamber. In this manner gas entering the cell 16 from the inlet conduit 48 has imparted to it a spiral flow pattern which carries throughout the length of the cylinder to the upper portion thereof where an outlet conduit 50 is formed in the thermal conductivity block 40 again as by drilling. In the embodiment illustrated the axis of the conduit discharge orifice (or the direction of discharge) lies in a plane normal to the axis of the chamber. Thus little or no velocity axially of the chamber is imparted to the gas. A similar inlet conduit 48 and outlet conduit 50 are provided for the cell 18. In other embodiments, the axis of the conduit discharge orifice lies in a plane normal to the chamber axis and in the direction of the spiral flow such that a component of velocity axially of the chamber is imparted to the gas.

In practice each of the cells 16, 18 (FIG. 1) whose detecting elements 24 are connected in opposite arms of the bridge 26, are both fed at their lower ends simultaneously by the gas effluent from the gas chromatograph 10 through a conduit 12 by splitting the gas flowing from the conduit 12 so as to flow one-half to the cell 16 and one-half to the cell 18. The split ratio should be maintained fairly precisely to insure that the velocity of gas flow through the respective cells is substantially the same. By thus creating a spiral flow, the gas velocity adjacent the detecting elements 24 is appreciably reduced and the turbulence of such gas flow is small. Additionally the flow of the gas components through the two measuring cells improves the sensitivity of the detector, reduces tailing and permits the cell to respond more quickly to changes in the make up of the gas.

In like manner the pure carrier gas is split and passed at equal rates through the remaining two cells 20, 22 which then become the reference cells. If only two cells are used, a simple fixed resistor may be substituted for the detecting element in the bridge circuit.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:
1. In a thermal conductivity detector, the improvement comprising:
   a heat absorbing body enclosing a cylindrical gas detecting chamber therein having first and second closed ends and an axis,
   said chamber being provided with a gas inlet conduit through said body having a discharge orifice adjacent said first end adapted to discharge gas generally tangentially into said chamber,
   said gas detecting chamber also being provided with a gas outlet conduit through said body spaced apart from the discharge orifice of said inlet conduit, whereby gas flow through said chamber is substantially a spiral path from said discharge orifice to said outlet conduit with the gas velocity varying directly as a function of radial distance from the axis of said chamber, and
   a lineal detecting element positioned substantially coaxially within said chamber between said inlet conduit discharge orifice and said outlet conduit, whereby turbulence is reduced in the vicinity of said element.

2. The thermal conductivity detector set forth in claim 1 wherein the orientation of said discharge orifice imparts substantially zero velocity axial of the chamber to the discharge therefrom.

3. The thermal conductivity detector set forth in claim 1 in which said heat absorbing body encloses a second cylindrical gas detecting chamber substantially identical to said first chamber and including said inlet and outlet conduits and said detecting element, the inlet conduit to each of said chambers being joined together to form a common inlet conduit.

4. The thermal conductivity detector set forth in claim 3 wherein the orientation of each of said discharge orifices imparts substantially zero velocity axial of the chamber to the discharges therefrom.

5. The thermal conductivity detector set forth in claim 3 wherein said second end of each of said chambers is closed by respective insulating glands positioned in the periphery of said body, each said gland supporting a different one of said detecting elements.

6. In a thermal conductivity detector, the improvement comprising:
   a heat absorbing body enclosing a cylindrical gas detecting chamber therein having first and second closed ends and an axis,
   conduit means extending through said body for effecting gas flow spirally through said chamber along said axis, and
   a lineal detecting element positioned coaxially within said chamber, whereby turbulence is reduced in the vicinity of said element.

References Cited
UNITED STATES PATENTS

| | | | |
|---|---|---|---|
| 2,750,798 | 6/1956 | Ruskin et al. | 73—204 |
| 2,887,879 | 5/1959 | Vonnegut | 73—204 |
| 2,751,777 | 6/1956 | Cherrier | 73—27 |
| 2,619,409 | 11/1952 | Spracklen | 73—27 |
| 2,652,315 | 9/1953 | McEvoy | 73—27 |
| 2,888,330 | 5/1959 | Kapff | 73—27 |
| 3,007,333 | 11/1961 | Chadenson | 73—27 |

RICHARD C. QUEISSER, Primary Examiner

C. E. SNEE, Assistant Examiner

UNITED STATES PATENT OFFICE

CERTIFICATE OF CORRECTION

Patent No. 3,474,660                        October 28, 1969

John W. Dooley

It is certified that error appears in the above identified patent and that said Letters Patent are hereby corrected as shown below:

Column 3, line 40, "normal" should read -- anormal --.

Signed and sealed this 21st day of April 1970.

(SEAL)
Attest:

Edward M. Fletcher, Jr.                    WILLIAM E. SCHUYLER, J
Attesting Officer                            Commissioner of Patent